Aug. 2, 1960     R. L. STONE     2,947,163
MATERIAL TESTING APPARATUS AND METHOD
Filed March 20, 1956     8 Sheets-Sheet 4

1st CYCLE

TESTED IN
$NH_3$

Both tests are on Dav.#2 catalyst. (See Fig. 4) Sample weight of 0.15 gm. Same instrument sensitivity in all cases, Chart speed of 0.2 in./min.

2nd CYCLE

TESTED IN
$H_2O$

1st CYCLE

2nd CYCLE

*Fig. 5.*

INVENTOR.
Robert LeGrand Stone

R. L. STONE 2,947,163

MATERIAL TESTING APPARATUS AND METHOD

Filed March 20, 1956

INVENTOR.
Robert LeGrande Stone

# United States Patent Office 2,947,163
Patented Aug. 2, 1960

2,947,163

MATERIAL TESTING APPARATUS AND METHOD

Robert L. Stone, 2607 Hillview Road, Austin 3, Tex.

Filed Mar. 20, 1956, Ser. No. 572,697

17 Claims. (Cl. 73—15)

The present invention relates to methods of and apparatus for testing materials, and, more particularly, relates to a calorimetric method of and apparatus for measuring the activity or content of a particular substance of materials, for example, catalysts and the like.

There has been a need for apparatus and methods of determining the activity or content of a specified substance of materials, for example, catalysts, which are fast, inexpensive and provide reliably efficient results. Prior methods are complex, slow, and require expensive equipment.

It is therefore a major object of the present invention to provide a method of and apparatus for testing or determining the activity or the content of a specific substance of materials, for example, catalysts, which are efficient, rapid and relatively inexpensive and by which highly accurate and reliable results are obtained.

It is yet a further object of the present invention to provide a method of and apparatus for testing or determining the activity of materials wherein a standard of comparison or relatively inert material and the material whose activity or a specific content is to be determined are heated in an inert gas, that is a relatively low poisoning gas, at the test temperature until the temperature of both materials is time stable, that is constant as opposed to rising or falling at controlled rates, and then rapidly replacing the inert gas with a relatively high poisoning gas which causes a relatively violent exothermic or endothermic reaction, and measuring the reaction as a determination of the activity or content of the substance of the material.

Yet a further object of the invention is the provision of an apparatus for determining the activity or the content of a specific substance in the materials which employs a standard of comparison which may be used for a plurality of tests.

Yet a still further object of the invention is the provision of a method and apparatus of the character mentioned in which tests may be run under the pressure conditions, either positive or negative pressures, at which the material tested is to be used.

Other and further objects, features and advantages of the invention will appear from the following detailed description of presently preferred examples of the invention, given for the purpose of disclosure, and taken in conjunction with the accompanying drawings, where like character references refer to like parts throughout the several views, and where.

Before referring to the detailed drawings, it might be noted that the present invention is somewhat akin to one known in the art as differential thermal analysis wherein a standard of comparison or relatively inert substance and a sample of test material are heated simultaneously. In differential thermal analysis, the samples are heated at a practical rate of temperature rise and any endothermic or exothermic reactions occurring in the test material as a function of temperature or other environment cause the temperature of the test material to momentarily be, respectively, below or above that of the standard. The reactions in conventional apparatus are of certain classes: namely, dehydration or dehydroxylation; other types of decompositions such breakdown of carbonates and the like; oxidation, such as burning carbonaceous matter; mineral inversions such as alpha-quartz to beta-quartz; and melting or formation of new minerals.

The present invention differs from the above in that a different class of reaction is utilized, namely, heat of adsorption (positive or negative) of fluids (either gas or liquid) on solids. The method is of the class which might be termed a "dynamic gas" method wherein the gas is made to flow through the test powder during the period of the test. Thus, the to-be-adsorbed gas is supplied to the material as fast as the material can adsorb it and, conversely, if a gas is given off by the material, it is swept away as rapidly as liberated.

In general, the invention includes flowing a relatively low poisoning or inert gas through a test material and through a comparison material, then flowing a relatively high poisoning gas through both said materials, and instrumentally observing the temperature differential caused by the last-mentioned step as an indication of the activity or the content of a specific substance of the material. The test may be made at atmospheric or negative or positive pressures, and the materials may be recycled for further tests.

Figure 1:
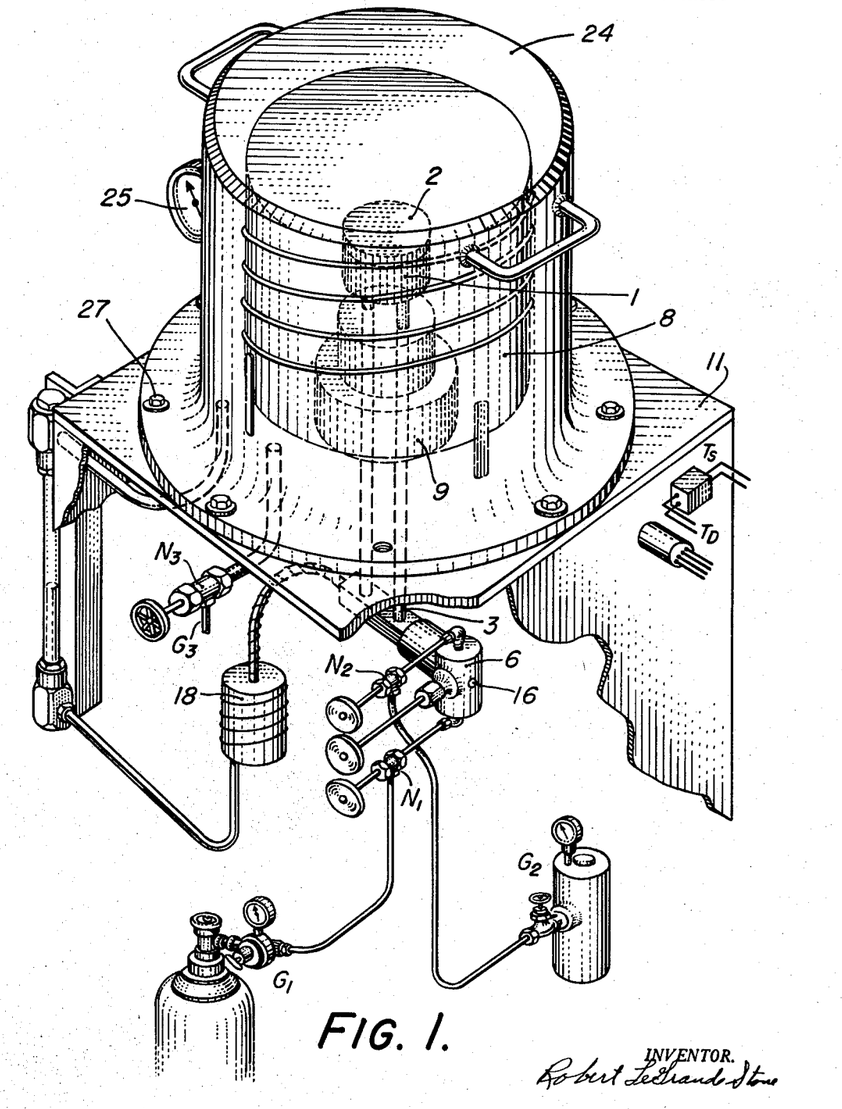
Figure 1 is a phantom, isometric view of an apparatus constructed according to the invention.
Figure 2:
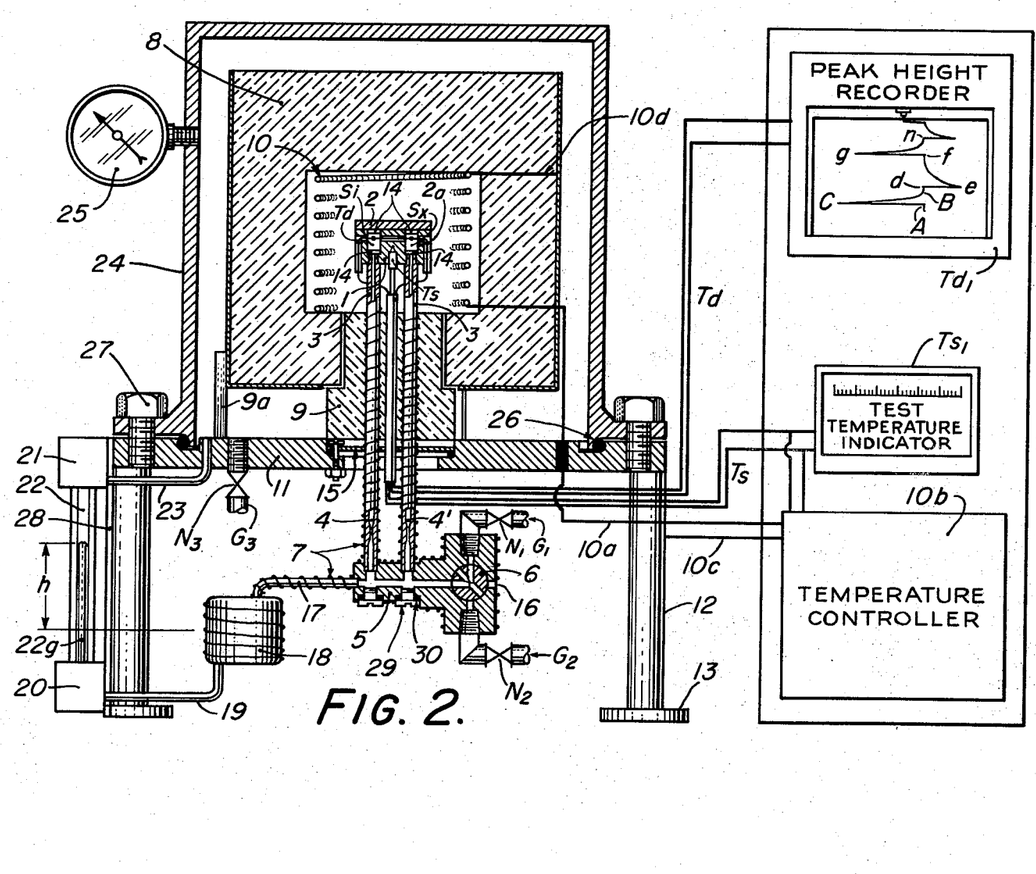
Figure 2 is a side elevation, partly in section, illustrating the apparatus of Figure 1.

Referring now to the drawings, and particularly to Figures 1 and 2, a presently preferred apparatus is illustrated which includes a sample holder having the body 1 and the cap 2 for holding the materials, the cap 2 serving the purpose of balancing the amount of metal or material above and below the samples $S_i$ and $S_x$ (Figure 2) placed into the material holding chambers or cavities $2a$ (Figure 2) disposed in the body 1 of the sample holder. The sample holder may be of any desired shape, here shown as circular, when viewed in horizontal cross section, and the body and cap may be made of any substance that will withstand the temperature to be encountered and which does not corrode, react with the test materials, melt, or have inversions of its own. For units designed for temperatures up to 1100° C., Inconel, nickel or platinum metals or a ceramic material may be used. Other materials, of course, may be used.

Referring now to Figure 2, the size of the chambers or cavities 2a and sample holder 1 are not critical, but certain effects in practice have been observed. A large sample causes the measurable effects of reaction to be stronger but less distinct than a small sample. At present, optimum results are obtained by making the sample chambers or cavities 2a one-fourth inch in diameter and three-eighth inches deep, and the sample holder one and one-half inches in diameter by three-fourths inch in height. This size cavity requires about 0.25 to 0.30 gm. of sample.

In order to supply a flow of gas through the powdered samples Si and Sx, the tubes 3 are provided, which may be of any desired material, for example metal alloys, which tubes may also serve as a support for the sample holder 1 as illustrated. Thus, the tubes 3 at their upper ends enter into the chambers or cavities 2a so that gas is flowed through the samples in accordance with the dynamci gas principle. The upper ends of the tubes 3 may be connected in the body 1 of the sample holder and extend into the cavities 2a in any preferred manner. No detailed description of this detail is deemed necessary.

A manifold 5 is provided for the purpose of carrying dynamic gas to both the tubes 3. The manifold 5 is provided with a multiple valve 6 of any conventional type to selectively permit the entry of gas $G_1$ and gas $G_2$ to be fed through the valved lines $N_1$ and $N_2$, respectively, for selectively feeding gas to the samples Si and Sx.

The materials Si and Sx are ordinarily placed in the chambers 2a in powdered form and there is a difference in resistance to gas flow of these materials. Accordingly, if these resistances were used in controlling the flow of gases the amount of gas flowing therethrough would be different. In order to provide that the amount of gas flowing through the materials Si and Sx is substantially the same, the restrictions or orifices 4 and 4' are provided in the tubes 3 so that the pressure on the valve side of the orifices is greater than on the sample side. These orifices may be placed anywhere between the manifold 5 and the body 1 of the sample holder. In operation, the restrictions or orifices 4 and 4' make the gas flow through Si very nearly the same as that through Sx because the resistance through 4 plus Si is, percentagewise, very nearly the same as that through 4' plus Sx. For good results it has been found that the minimum flow of gas must change the gas within the interstices of the test material at least once per second. The maximum flow of gas is just short of that which would cause physical disturbance of the test material.

When water vapor (steam) or any other substance is used that condenses at a temperature above room temperature, every part of the apparatus handling that substance must be kept at a temperature of at least a few degrees above the dew point or condensation temperature thereof. To this end, the gas distributing system is provided with a heater, which may be of any preferred type, for example, the resistance-wire winding 7 disposed about the tubes 3, manifold 5 and valve 6, as well as other parts of the apparatus. This wire is heated by electric current in the usual manner from a variable transformer or a rheostat or any other suitable electric power source, not shown. Of course, if the various valves and other parts of the gas distributing system are electric conductors, they must be electrically insulated from the heater wires by suitable high temperature electrical insulation. Other means, of course, may be utilized for heating the various parts as described. Of course, if the gases used do not condense at room temperature, these auxiliary heaters may be omitted.

The sample holder 1 is disposed within the furnace 8, the latter furnishing the energy to raise the temperature of the sample holder to the test temperature. The furnace may be heated by any suitable fuel, for example, gas, oil, electricity and the like. Induction heating of the sample holder is also feasible under certain circumstances. In the apparatus illustrated, the electric resistance wires 10 are provided because excellent and inexpensive controllers are readily available for obtaining and maintaining the desired temperature in the apparatus. The wires 10 are connected by the electrical conductor 10a to the temperature controller 10b and the circuit is completed to ground by the conductors 10c and 10d. The temperature controller 10b may be of any preferred type and no detailed description thereof is deemed necessary as many suitable controllers are readily available on the market.

Preferably, the furnace or heating device should easily be removable. As illustrated in Figure 2, the furnace 8 is supported by and rests on legs 9a and on a refractory base 9, and the latter rests upon a mounting platform 11 supported by the legs 12 having the bases 13. Any suitable mounting means, however, may be utilized.

Figure 11:
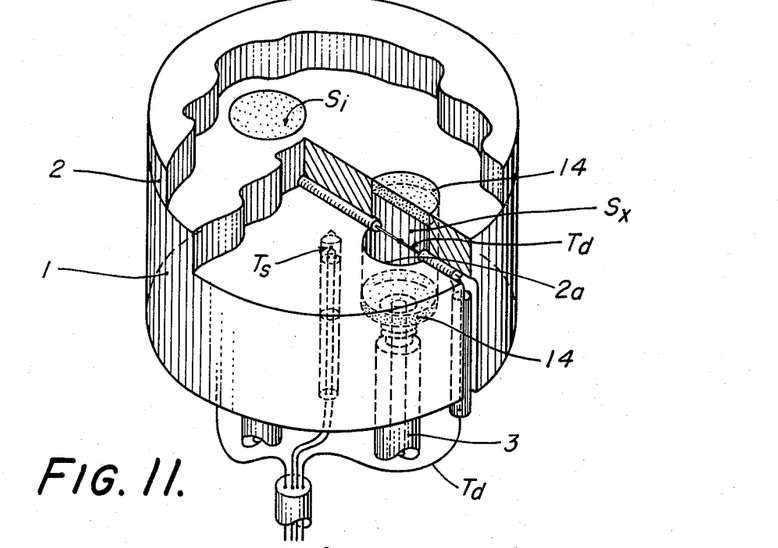
Figure 11 is an enlarged, isometric view, with parts cut away, illustrating the sample holder.

Turning again to the sample holder, and referring to Figures 2 and 11, means for uniformly distributing the gas are provided by diffuser discs 14 at the upper and lower ends of the chambers or cavities 2a. These may be discs or formed of a shape to snugly fit within the chambers and are for the purpose of distributing the gas that comes from the small bore tubes 3 across the entire cross section of the chambers 2a. These discs preferably are formed of a porous ceramic material, although perforated materials, for example perforated Inconel and platinum, as well as other materials may be used. The discs 14 also prevent the powdered sample materials Si and Sx from falling down into the gas tubes 3 and prevent the samples from being blown from the chambers. Thus, in operation, a ceramic or perforated disc is disposed at the top and the bottom of the samples disposed in the chambers of the sample holder.

As shown in Figures 2 and 11, a thermocouple Ts is provided to measure the temperature of the standard sample or of the sample holder. The bead or what is technically called the hot junction, of the thermocouple Ts may be disposed in the metal part of the sample holder, as illustrated, or may be disposed inside the chamber 2a having the inert or standard of comparison material Si. The position of the bead is a matter of choice inasmuch as sufficient accuracy can be obtained with the bead in either position although the temperature in the metal will be a few degrees different from that inside Si.

Referring again to Figure 2, a thermocouple is also provided to measure the difference in temperature between Si and Sx while the adsorption reaction is taking place. To this end, one junction of the thermocouple Td is provided in the inert standard Si and the other junction in the test sample Sx. This arrangement is quite sensitive in that the thermocouple bead in the chamber 2a holding the test sample Sx develops an E.M.F. at the temperature of the test very large compared to E.M.F. developed by the temperature rise when the poison gas $G_2$ is injected. Thus, a thermocouple bead is placed in the chamber 2a housing the standard Si and connected in electrical opposition to the other thermocouple bead thereby providing a counter E.M.F. Of course, if desired, the counter E.M.F. could be provided externally with a potentiometer. Conveniently, the test temperature indicator $Ts_1$ is provided to indicate the temperature of the standard sample or of the sample holder and the recorder $Td_1$ is provided to give an indication and record the difference in temperature. Any of many such instruments being marketed may be used and since these instruments are of conventional construction and are readily available on the market, no detailed description thereof is deemed necessary.

Although thermocouples are illustrated as temperature measuring devices, obviously, thermometers of any type or metallic springs or other devices may be used. Thermocouples are presently preferred, however, because of certain advantages, namely, small gauge wires having low heat capacity and low thermal conductivity can be used, they are easily and inexpensively prepared, and instruments are readily available for use with them. The metals used for the thermocouples may vary widely; for example, iron-constantan, chromel-Alumel, platinum-platinum, rhodium may be used.

Figure 9:
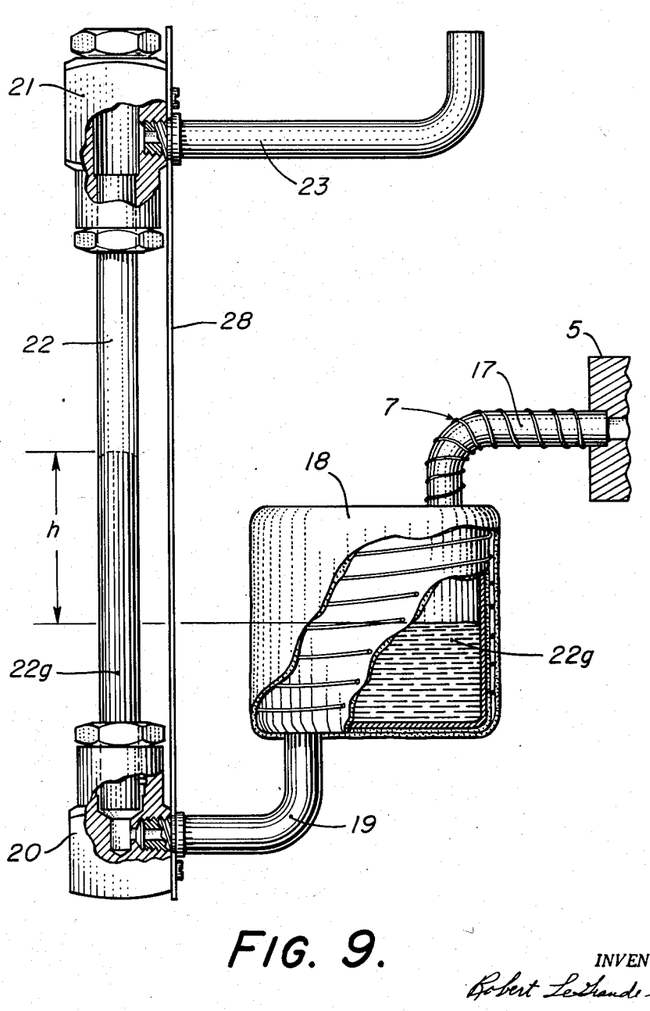
Figure 9 is a fragmentary view, partly in section, illustrating a preferred, heated well-type manometer.

A preferred form of pressure indicating device is illustrated in Figures 1, 2 and 9, and turning now to Figure 9, a preferred manometer is illustrated which includes the well 18 and glass tube 22 supported at each end by the fittings 20 and 21, which are simply metal terminal ends for mounting the glass tube 22. For convenience, the terminal ends may be mounted on the frame 28 which is secured to the support 11 (see Figure 2) in any preferred manner.

A tube 17, preferably a stainless steel tube, connects the well 18 to the manifold 5 and the tube 19 connects the lower portion of the well 18 to the bottom terminal 20 of the glass tube 22. The tube 23 connects the glass tube 22 to the pressure chamber, as described later, on the other side of the orifices 4. These tubes may be of any desired material, for example copper or stainless steel. Thus, the manometer indicates the pressure drop across the orifices 4 and 4' inasmuch as the well 18 is in pressure communication with both sides thereof. In practice, the center line of the well 18 is slightly above the top surface of the metal terminal 20 so that when the well is half filled with mercury 22g, the mercury will rise to visibilty in the glass tube. Also, in practice, the tubing 17 and the well 18 are wrapped with heater wires 7 so that the tube and the upper surface of the mercury in the well can be maintained at a temperature above the condensation temperature of the condensable gases flowing through the tube into the upper portion of the well. While the well may be constructed of any desired material, preferably it should be constructed of stainless steel or any metal that resists attack by the gases utilized and by mercury.

Figure 10:
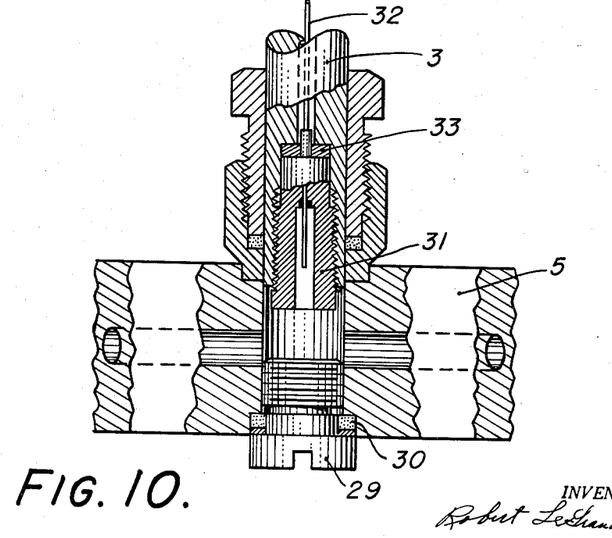
Figure 10 is a fragmentary view, partly in section, illustrating a preferred capillary assembly.

The flow of gas is regulated by the orifices or restrictions 4 and 4', which, in practice, may advantageously take the form of capillary tubes disposed within the tubes 3. The capillary tubes must be absolutely tightly sealed in the gas distributing tubes 3 and preferably should easily be removable for replacement or cleaning. Turning now to Figure 10, the capillary assembly is illustrated which includes the threaded plug 29 that is threadedly received in the manifold 5 and which is packed by a suitable seal 30, for example a gasket formed and sold under the trademark Teflon which is polymerized polytetrafluoroethylene. A ferrule screw 31 is provided which is a threaded tube screwed into the lower end of the gas distributor tube 3. The tiny capillary tube 32, which may be made of stainless steel, is silver soldered or otherwise secured into the metal ferrule screw 31. A gasket, such as a Teflon gasket 33 is provided to seal the ferrule screw 31 against the surface inside the tube 3 when the screw 31 is tightened. The length and bore of the capillary tube 32 is chosen to give a desired flow at a reasonable pressure. In a presently preferred apparatus, the length of the capillary tube may be one and three-fourth inches to two inches in length and may have a bore of six mils.

In assembling the capillary assembly, the ferrule screw 31 is screw threaded into the lower end of the gas distributing tube 3 and engages and thereby compresses the packing 33, the capillary tube having previously been secured into the metal ferrule screw as described. The threaded plug 29 may then be screwed into position to sealingly close the lower end of the bore through the manifold 5.

It will be noted that while only a single capillary arrangement is illustrated, it will be understood that one is disposed in each of the gas distributing tubes 3.

The operation of the apparatus of the invention as well as an example of the method of the invention is as follows. In the following example it is assumed that the activity of a catalyst is desired to be ascertained, although the activity of other materials, content of certain materials, for example the carbon content of materials, may be ascertained. Accordingly, the following descriptions of tests are illustrated merely for the purpose of disclosure and tests of other materials and uses will readily suggest themselves to those skilled in the art. In the example immediately following, the test was conducted at atmospheric pressure so that it was unnecessary to use the pressure cover 24.

As previously mentioned, assuming that the activity of a catalyst is to be determined the test may be conducted at a modestly elevated temperature, for example, about 300° C. The temperature of the apparatus can either be brought up to test temperature before putting the test specimen in place or the test specimen can be put in place before starting the heaters. To bring the sample holder from room temperature to test temperature may require thirty minutes or so, but once the test temperature is obtained, specimens of the material can be tested one after another without cooling the apparatus between tests.

The standard or inert material $Si$ is conveniently used for temperature reference. The standard must have heat capacity, heat conductivity and, probably, physical sorption values approximately those of the test material, it must not react chemically with the gases to be employed, and it must have a heat of chemical adsorption considerably lower than that of the test material. The inert material is preferably in the form of a powder, about 100 mesh is suitable, although other grain sizes may be used. Suitable inert materials for the standard are alumina (the alpha and gamma forms being preferred), zircon, pyrophyllite, quartz, calcined clay or other similar substances.

At the beginning, one of the cavities $2a$ is filled with the inert standard $Si$ which is placed on the lower porous disc 14 and the upper porous disc 14 is placed in the cavity on top of the powder, flush with the top surface of the body 1 of the sample holder. The inert material need not be removed after each test although it may be removed if so desired.

For accurate results, the test sample of material, for example the catalyst, should be exposed only to inert surroundings, such as gas, up to the time when it is first exposed to the poison gas. Therefore, the test is started with the selector valve 6 in the position shown in Figure 2 so that inert gas $G_1$ is being fed into the system. If, by accident, the poison gas $G_2$ is being fed into the system when the test sample is put in place as described below, it will be poisoned instantly and the test is of little or no value. The test sample should then be removed and the trouble corrected.

Referring to Figure 2, and assuming that the apparatus has reached the desired test temperature with no catalyst specimen in place and the inert gas $G_1$ is being fed into the system, the furnace 8 is removed or lifted, exposing the sample holder. The cap 2 is removed and a carefully weighed sample of catalyst $Sx$ to be tested is then poured into the cavity. An amount is used which will evenly fill the cavity with little or no tamping. The porous disc 14 is placed on top of the test sample and is pressed down flush with the top surface of the sample holder. The cap 2 and the oven 8 are then replaced.

During the time required for placing the test specimen, the temperature of the sample holder ordinarily will have dropped a few degrees, therefore a few minutes, usually about ten minutes, is required for the heat source to again stabilize the temperature at the test level.

It should be noted that during the period of time when a sample $Sx$ is being put in place until the test temperature is stabilized it is preferable to either disconnect the differential temperature measuring device $Td_1$ or protect it by any appropriate means because of the very great temperature differential that exists when a cold sample is first placed in the already hot sample holder. When the test temperature is stabilized, however, the differential temperature measuring device is either turned on or reconnected.

The operator then turns the selector valve 6 so that the poisoning gas $G_2$ through valved line $N_2$ is injected into the system at a rate of flow the same as for the inert gas $G_1$. The poisoning gas flows quickly up through the powders $Si$ and $Sx$ and escapes through the space between the loosely fitted cap 2 and the sample holder body 1. The instant the poison gas reaches both of the powders, the adsorption reaction begins and the temperature of the catalyst specimen rises abruptly. At the same time, the temperature of the inert or standard sample $Sx$ rises an amount dictated by its own heat of adsorption, but its temperature rise is nearly zero compared to that of the catalyst. A temperature differential between $Si$ and $Sx$ is thereby created which will reach its maximum in a matter of a very few seconds. The differential temperature measuring device $Td_1$ registers this differential.

The maximum temperature differential is the feature used as an indication of the activity of the material or catalyst. If a recording device is used for the temperature differential, as illustrated, the area under the curve can be used as well as the height or length of the peak. As soon as the temperature of the catalyst $Sx$ has reached its maximum, it will rather rapidly fall back to the test level thereby giving a pointed shaped tracing on the recorder chart as illustrated on the peak height recorder $Td_1$.

After the recording of the temperature differential is made, the valve 6 may be turned to cut off the flow of gas to the sample chambers 2a and to relieve the pressure through the exhaust port 16. It should be noted that the exhaust port 16 quickly relieves the pressure in the manifold 5 and thus aids in quickly supplying the poisoning gas to the samples of material. The furnace may then be removed, the cap 2 removed and the sample $Sx$ removed. A new sample to be tested may then be inserted and the test repeated as previously described.

Figure 3:
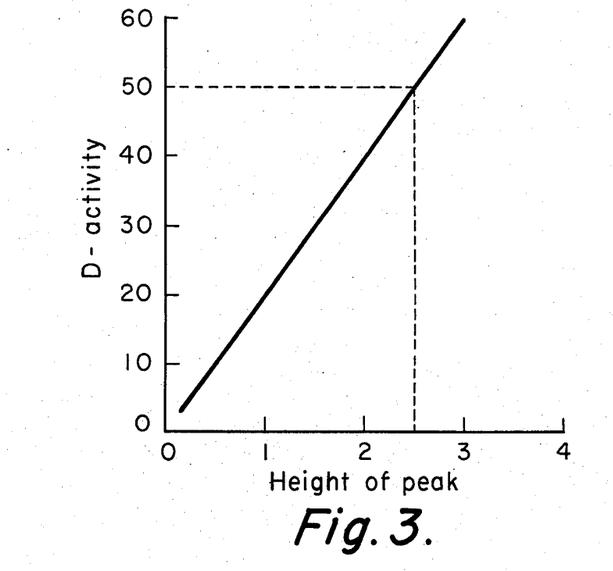
Figure 3 is a calibration graph of the apparatus according to the invention obtained by obtaining the intensities of several samples of material of known activity values.
Figure 4:
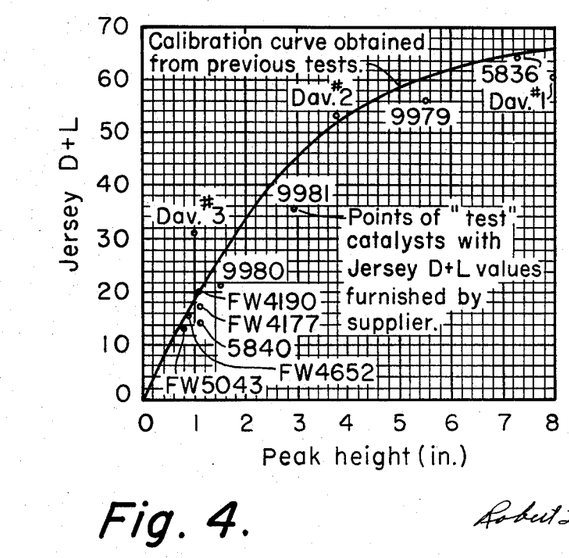
Figure 4 illustrates a typical calibration curve prepared by actually plotting the peak height of numerous samples of catalysts along with the points obtained for 12 "unknown" test materials, the dots being the Jersey $D+L$ values furnished by the supplier, Figure 5 are tracings of actual recordings of tests made with the apparatus according to the invention, Figure 6 are tracings of actual tests run using ammonia, piperidine and water vapor as the poison gas.
Figure 5:
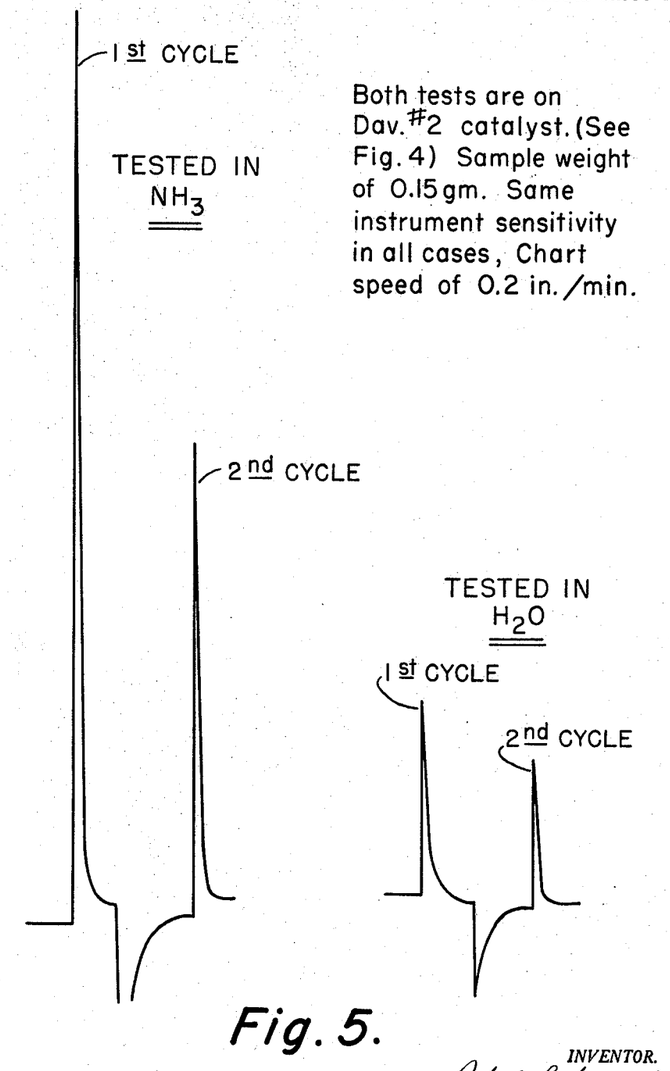

In practice, a calibration graph is made for each apparatus by obtaining the intensities for several samples of material, for example, catalyst, of "known" activity values. Such a calibration chart is shown in Figure 3, and referring now to Figure 3, this chart shows the peak height on the X-axis and the "D-activity" on the Y-axis. The term D-activity is utilized to designate the activity as determined by the apparatus and method according to the invention. A correlation chart can then be prepared which would show the relationship of the D-activity to other activity coefficients, such as the Jersey $D+L$ or the surface area. For example, suppose the peak height of a sample of a catalyst is 2.5 height units. From the calibration chart, Figure 3, it has a D-activity of 50 as illustrated in dotted lines.

Turning back again to Figure 2, the appearance of the recorder tracing made with the automatic recorder $Td_1$ is illustrated. The poisoning fluid was injected at A, the differential temperature reached its maximum at C giving a height from A to C. The differential temperature then returned to zero at B in about five minutes. The area under the curve can be measured by grids or with a planimeter. It may be preferable to use the height rather than the area because the former is much more easily measured and is reliably reproducible.

If a mild poisoning gas is used, the test powder can be "cycled" for confirmation. Referring again to the peak height recorder, after the reaction or effect of the poisoning gas has subsided, the poisoning gas is quickly replaced at $d$ with the inert gas and an opposite temperature effect, here an endothermic effect, is observed as the test powder is restored, here illustrated by the letter $e$. This is followed by reinjection at $f$ of the poisoning gas, causing the exothermic effect, here illustrated by the letters $g$ and $n$. This, of course, may be repeated as desired.

Before beginning a series of tests, the flow through the orifices 4 and 4' is adjusted with the needle valves $N_1$ and $N_2$. For example, the selector valve 6 is turned to the position shown in Figure 2. The valve on the cylinder of gas $G_1$ (see Figure 1), connected to the valve 6 is opened. The needle valve $N_1$ is then adjusted until the mercury 22G in the glass tube 22 rises to the desired height $h$, as seen on Figure 2. The selector valve 6 is then turned to the lower port and the needle valve $N_2$ is adjusted until gas $G_2$, see Figure 1, produces the same mercury height $h$, as shown in Figure 2. The flow of the two gases is thereby preadjusted and the operator has the simple task in making the test of simply turning the valve 6 from one gas to another. At intervals, however, he may have to readjust the needle valves $N_1$ and $N_2$.

In the event the test is desired to be run under pressure, that is under pressure greater than atmospheric, the test is the same as previously described except that the pressure chamber is used. The pressure chamber is formed of the parts 24 and 11 and, before adjusting the flow of gas with $N_1$ and $N_2$, the pressure chamber top 24 is placed in position on the floor element 11 and the screws 27 secured. The valve $N_3$ is turned on to supply pressure by $G_3$ until the desired pressure is obtained as indicated on the gauge 25. The method may then be continued as previously described.

In making the test a number of gases or fluids may be used as the "poison gas" and others used as reactivators or inert gases. Any two fluids can be used so long as they represent two degrees of poisoning. Obviously, the wider apart these two are, the greater, and more measurable, is the observed effect. An example of an inert or relatively low poisoning gas is nitrogen, although any relatively low poisoning gas may be used. As to the example of relatively high poisoning gas, water vapor, ammonia, piperidine, pyridine, pyrrole and quinoline and any other vaporous or gases materials which can be adsorbed on the surfaces of the particles of the test materials. The test appears to be easiest when the test fluids are gases or vapors, hence the lowest appropriate test temperature is the condensation temperature of the gases. As mentioned, the test may be made under pressure. As to the maximum test temperature, it is desirable that the test temperature is near the operating temperature of the material being tested, the temperatures ranging from about 100° C. to about 600° C., although other temperatures may be used. It has been found that lower temperatures are just as satisfactory and much more easily controlled than the higher temperatures and, preferably, the temperature should be well above any "hydration" temperatures which could conceivably cause erroneous conclusions with catalysts to be used at higher temperatures. For example, a temperature in the range of about 300° C. is used because this is well above any hydration temperatures which could conceivably cause erroneous conclusion with catalyst to be used at higher temperatures.

The test pressure should be within the stability limits of the particular gas being used. Thus, any desired pressure may be used, for example one, two or three atmospheres, or, if desired, the test may be operated under vacuum. Preferably, as mentioned previously, the pressure conditions of the test may approximate the pressure conditions when the material being tested is used.

Figure 6:
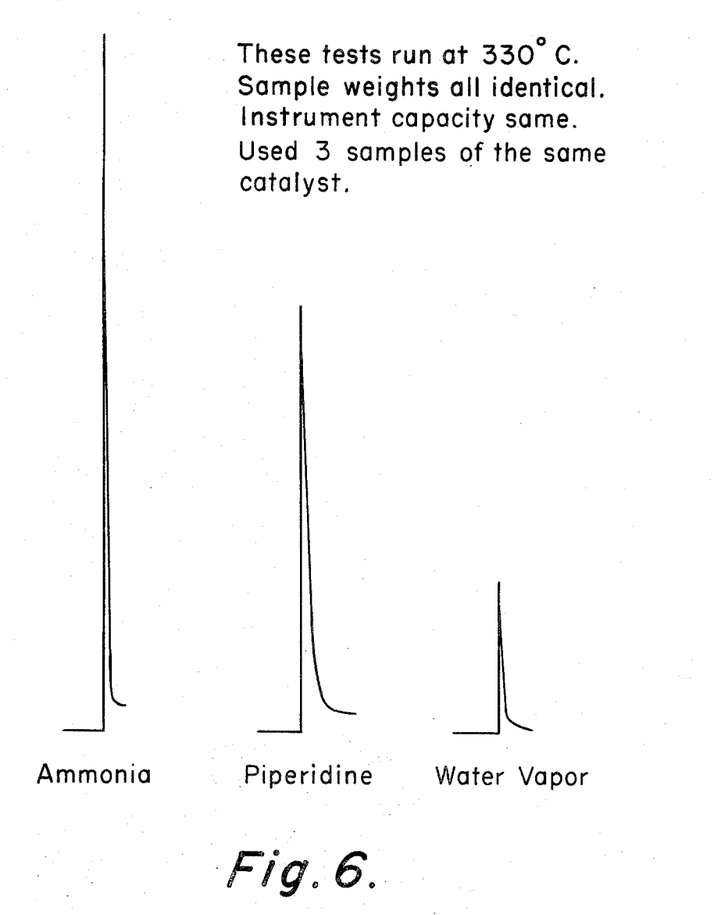

Referring now to Figure 6, a series of tests were run on the same sample, and all were run at 330° C. and at atmospheric pressure. The sample weights were all identical and the instrument capacity was the same. In these runs nitrogen was the inert or low poison gas used. In the left hand tracing, ammonia was the poison gas used. In the middle tracing, piperidine was the poison gas used.

In the tracing on the right hand side, water vapor was the poison gas used.

It is believed that the method is apparent from the preceding description, but by way of review, the method comprises flowing an inert or low poisoning gas through a test sample and a standard sample until a generally constant temperature is obtained, either under pressure, vacuum or atmospheric, rapidly replacing the inert gas with a poison gas, and indicating the intensity of the effect as a measure of the activity of the material.

Figure 7:
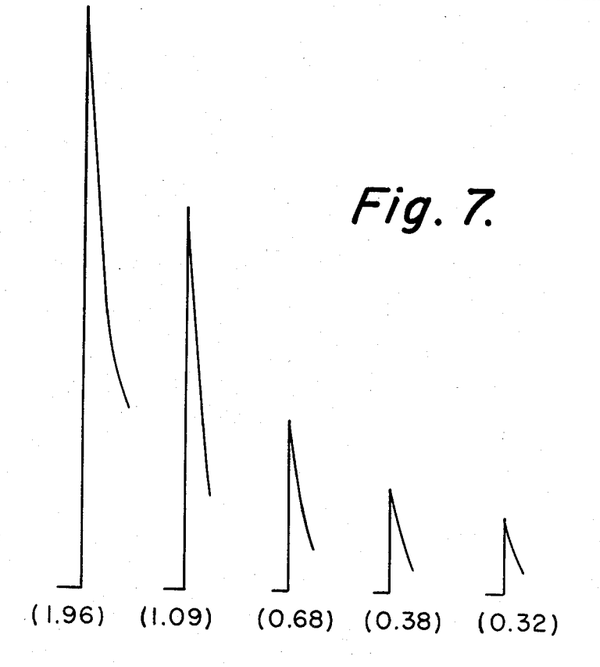
Figure 7 are tracings of actual tests illustrating the peaks obtained for five samples having varying carbon contents, as shown in parentheses.
Figure 8:
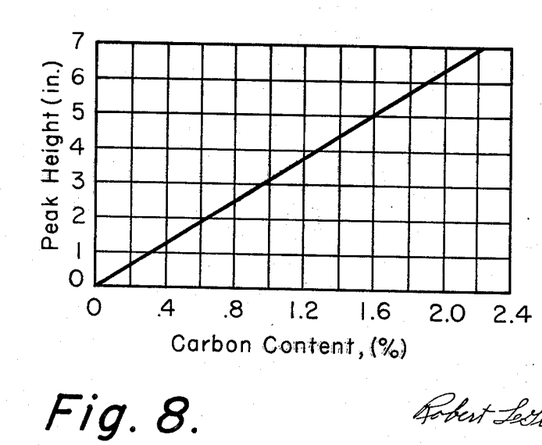
Figure 8 is a graph showing the five points or peaks of the graph of Figure 7.

As previously mentioned, the present invention, both the apparatus and method of the invention, may also be used to determine the content of certain materials, for example, the carbon content of a catalyst. The apparatus and method is particularly advantageous in that a relatively short period of time is required for this purpose, for example about three to five minutes in many instances. In determining, for example, the carbon content of a catalyst, the procedure is the same as previously described for the activity of a material being tested. The only difference is for the temperature and gases. For determining the carbon content of a catalyst, the test temperature preferably is from about 525° C. to about 600° C., the inert gas $G_1$ is nitrogen and the active or poisoning gas $G_2$ is pure oxygen. Upon injection of the oxygen, a deflection of the peak height recorder is observed in the same manner as in determining the activity of the material. In this connection, reference is now made to Figure 7 which contains a series of tracings illustrating peaks obtained for five catalyst samples having the carbon content shown in parentheses. Figure 8 illustrates a graph illustrating these five points showing the peak height with relation to carbon content of the particular catalyst.

Thus, the content of materials may be determined by flowing a gas or vapor through the sample which reacts with the particular substance to be determined so that a temperature reaction is obtained which may be recorded or indicated, as desired.

The present invention, therefore, is well suited and adapted to carry out the objects and attain the ends mentioned as well as others inherent therein. While a single embodiment of the invention and several representative examples are given, these are given for the purpose of disclosure, as many changes in arrangement and details of parts may be made and many other uses will readily suggest themselves to those skilled in the art which are encompassed within the spirit of the invention and the scope of the appended claims.

What is claimed is:

1. A method of determining the activity of material comprising, flowing a relatively low-adsorbable gas through a test material and through a comparison material, bringing the test material and the comparison material to the same and substantially a constant temperature, then flowing a relatively high adsorbable gas through both said materials, said comparison material having a heat capacity and a heat conductivity approximating those of the test material, having a heat of chemical adsorption lower than that of the test material and being chemically unreactive to both said gases, and measuring the temperature differential caused by the second-mentioned gas as an indication of the activity of said test material.

2. The method of claim 1 where the test temperature is in the range from about 100° C. to about 600° C.

3. The method of claim 1 where both said materials are maintained at atmospheric pressure.

4. The method of claim 1 where both said materials are maintained under pressure.

5. The method of claim 1 where both said materials are maintained under a negative pressure.

6. A method of determining the content of a selected substance contained in a material comprising, flowing a relatively inert gas through the material and a comparison material, bringing both said materials to the same and to a substantially constant temperature, then flowing a gas readily adsorbed by the surface of said substance through both said materials, said comparison material having a heat capacity and a heat conductivity approximating those of the first-mentioned material, having a heat of chemical adsorption lower than that of said first-mentioned material and being chemically unreactive to both of said gases, and measuring the temperature differential caused by the last-mentioned gas as an indication of the content of said substance in said material.

7. A method of determining the activity of material comprising, uniformly distributing a relatively low adsorbable gas through a powdered test material and through a powdered comparison material, bringing both said materials to the same and to a substantially constant temperature, then uniformly distributing a relatively high adsorbable gas through both said materials, and measuring the temperature differential caused by the last-mentioned step as an indication of the activity of said test material, said comparison material characterized by having a heat capacity and a heat conductivity approximating those of the test mterial, having a heat of chemical adsorption lower than that of said test material and being chemically unreactive to the gases.

8. A method of determining the content of a selected substance in a material comprising, flowing a first selected gas through both a test material containing the substance and a comparison material, bringing both said materials to the same and to a substantially constant temperature, and then flowing a second gas having different reactive stability with the test substance through both of said materials, said comparison material having a heat capacity and a heat conductivity approximately those of the test material, and being chemically unreactive to both said gases, and measuring the temperature differential caused by the last-mentioned gas as an indication of the content of said substance in said test material.

9. Apparatus for testing material comprising, a furnace, a pair of generally cylindrical material holding chambers in said furnace, gas distributing means disposed at each end of each of the chambers for confining the material therein and distributing the gas therethrough, a pair of tubes, one each connected to an end of one each of said chambers for flowing gas through said chambers, means for selectively supplying a first and second gas to said tubes, restrictions in said tubes for providing a substantially constant rate of flow of said gas to said chambers, means for heating said furnace at a substantially constant temperature, and means responsive to the temperature differential within said chambers for indicating the temperature differential within said chambers.

10. The apparatus of claim 9 including a pressure chamber removably disposed about said furnace, and including means for maintaining said pressure chamber under preselected pressure conditions.

11. The apparatus of claim 9 where said tubes support said chambers in said furnace.

12. The apparatus of claim 9 where said gas distributing means comprise porous discs.

13. The apparatus of claim 9 including a manometer connected on opposite sides of said restrictions for indicating the pressure drop thereacross.

14. The apparatus of claim 9 where said restrictions comprise capillary tubes removably positioned in said tubes.

15. Apparatus for testing material comprising, a furnace, a pair of material holding chambers in said furnace, means for selectively flowing a first gas and a second gas through said chambers, restrictions in said means for providing a substantially equal rate of flow of said gas to each of said chambers, diffusion means in the chambers for diffusing the gases throughout the chambers, means for heating said furnace at a substantially constant temperature, and means responsive to the temperature differential within said chambers for indicating the temperature differential within said chambers.

16. Apparatus for testing material comprising, a furnace, a pair of material holding chambers in said furnace, means for selectively flowing a first gas and a second gas of relative activity through said chambers, means for maintaining the furnace at a substantially constant temperature, means responsive to the temperature differential within said chambers for indicating the temperature differential within the chambers, and capillary tubes disposed in said means for selectively flowing said gases through said chambers thereby maintaining an equal rate of flow of said gases through said chambers.

17. The apparatus of claim 16 including a pressure chamber disposed about said furnace, and means for maintaining said pressure chamber under preselected pressure conditions.

References Cited in the file of this patent

UNITED STATES PATENTS 2,826,908     Skarstrom     Mar. 18, 1958

FOREIGN PATENTS 1,094,868     France     Dec. 15, 1954

OTHER REFERENCES

"An Apparatus for Differential Thermal Analysis," Bureau of Mines Publication, Report of Investigations No. 3762, July 1944.